United States Patent
Bragg et al.

(10) Patent No.: US 10,057,302 B2
(45) Date of Patent: Aug. 21, 2018

(54) CONTEXT-BASED SELECTION OF INSTRUCTION SETS FOR CONNECTING THROUGH CAPTIVE PORTALS

(71) Applicant: Microsoft Technology Licensing, LLC, Redmond, WA (US)

(72) Inventors: Scott M. Bragg, Snoqualmie, WA (US); Piyush Goyal, Redmond, WA (US); James Christopher Gray, Redmond, WA (US); Thomas W. Kuehnel, Seattle, WA (US); Triptpal Singh Lamba, Bothell, WA (US); Darya Mazandarany, Kirkland, WA (US); Sidharth Uday Nabar, Seattle, WA (US); Saumaya Sharma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 14/081,210

(22) Filed: Nov. 15, 2013

(65) Prior Publication Data

US 2015/0142980 A1      May 21, 2015

(51) Int. Cl.
    *G06F 15/16*       (2006.01)
    *G06F 15/177*      (2006.01)
    (Continued)

(52) U.S. Cl.
    CPC .......... *H04L 65/1069* (2013.01); *H04L 67/10* (2013.01); *H04W 4/003* (2013.01); *H04W 4/60* (2018.02); *H04W 48/18* (2013.01)

(58) Field of Classification Search
    CPC ....... H04L 9/083; H04L 9/321; H04L 9/3271; H04L 63/30; H04L 63/083; H04L 63/0853; H04L 63/166; H04L 65/1006; H04L 65/1016; H04L 65/1069; H04L 65/1073; H04L 67/02; H04L 67/04; H04L 67/24;
    (Continued)

(56) References Cited

U.S. PATENT DOCUMENTS 6,243,754 B1    6/2001   Guerin et al.
6,801,777 B2   10/2004   Rusch
            (Continued)

FOREIGN PATENT DOCUMENTS

WO        06059369 A1    6/2006

OTHER PUBLICATIONS

"International Search Report and Written Opinion Issued in PCT Patent Application No. PCT/US2014/065584", dated Feb. 26, 2015, 11 Pages.

(Continued)

*Primary Examiner* — Farzana Huq

(57) ABSTRACT

Embodiments personalize a set of network access points (NAPs) acting as captive portals for each user and/or user device. A cloud service, or the user device, accesses context describing the user device. The context identifies at least one NAP, and may include accounting data. One of the NAP is selected for connection based on the context, and an instruction set associated with the selected NAP is provided for replay by the user device to connect through the NAP. In some embodiments, instructions within the instruction set are also personalized to the user and/or user device based on the context.

20 Claims, 6 Drawing Sheets

(51) Int. Cl.
  *H04L 29/06* (2006.01)
  *H04W 4/60* (2018.01)
  *H04W 48/18* (2009.01)
  *H04W 4/00* (2018.01)
  *H04L 29/08* (2006.01)

(58) Field of Classification Search
  CPC ... H04L 67/26; H04L 67/306; H04L 67/2833; H04L 67/303; H04L 2/24; H04L 2/2898
  USPC .................. 709/204, 221, 227, 247
  See application file for complete search history.

(56) References Cited

U.S. PATENT DOCUMENTS

| | | | |
|---|---|---|---|
| 6,993,584 B2 | 1/2006 | Border et al. | |
| 7,330,486 B2 | 2/2008 | Ko et al. | |
| 7,472,200 B1 | 12/2008 | Taylor et al. | |
| 7,821,985 B2 | 10/2010 | Van Megen et al. | |
| 7,843,843 B1 | 11/2010 | Papp, III et al. | |
| 7,970,931 B2 | 6/2011 | Ventakaramaiah et al. | |
| 7,974,714 B2 | 7/2011 | Hoffberg | |
| 7,979,577 B2 | 7/2011 | Taylor et al. | |
| 8,078,753 B2 | 12/2011 | Bachmann et al. | |
| 8,271,655 B2 | 9/2012 | Dawson et al. | |
| 8,407,721 B2 | 3/2013 | Dyba et al. | |
| 8,683,193 B1* | 3/2014 | Hansen | H04L 29/06 713/153 |
| 2003/0065816 A1 | 4/2003 | Dharmadhikari et al. | |
| 2003/0204635 A1 | 10/2003 | Ko et al. | |
| 2003/0212800 A1 | 11/2003 | Jones et al. | |
| 2005/0268244 A1* | 12/2005 | Vignet | G06Q 10/06 715/760 |
| 2006/0274750 A1 | 12/2006 | Babbar et al. | |
| 2007/0030855 A1 | 2/2007 | Ribiere et al. | |
| 2007/0061482 A1 | 3/2007 | Higuchi | |
| 2007/0066304 A1 | 3/2007 | Lee | |
| 2007/0073785 A1* | 3/2007 | Laird | G06F 8/71 |
| 2007/0091861 A1* | 4/2007 | Gupta | H04L 12/24 370/338 |
| 2007/0211690 A1 | 9/2007 | van Megen et al. | |
| 2008/0049649 A1 | 2/2008 | Kozisek et al. | |
| 2008/0065762 A1* | 3/2008 | Nauerz | G06F 17/30873 709/224 |
| 2008/0076385 A1 | 3/2008 | Mayer et al. | |
| 2008/0080413 A1 | 4/2008 | Cole et al. | |
| 2008/0080419 A1 | 4/2008 | Cole | |
| 2008/0080457 A1 | 4/2008 | Cole | |
| 2008/0080458 A1 | 4/2008 | Cole | |
| 2008/0165683 A1 | 7/2008 | Saha et al. | |
| 2008/0192681 A1 | 8/2008 | Lee et al. | |
| 2008/0244451 A1* | 10/2008 | Goering | G06F 3/0482 715/811 |
| 2009/0313318 A1* | 12/2009 | Dye | G06Q 30/00 709/202 |
| 2009/0313358 A1* | 12/2009 | Shepherd | H04L 41/5054 709/221 |
| 2010/0106572 A1 | 4/2010 | Van Hoff et al. | |
| 2010/0115415 A1* | 5/2010 | Hickey | H04L 41/0253 715/736 |
| 2010/0184440 A1 | 7/2010 | Mao et al. | |
| 2010/0302958 A1 | 12/2010 | Wietfeldt et al. | |
| 2012/0209839 A1* | 8/2012 | Andrews | G06Q 10/10 707/728 |
| 2012/0278431 A1 | 11/2012 | Luna | |
| 2013/0023216 A1 | 1/2013 | Moscibroda et al. | |
| 2013/0060653 A1 | 3/2013 | Sharkey | |
| 2013/0086211 A1 | 4/2013 | Sondhi et al. | |
| 2013/0124712 A1 | 5/2013 | Parker | |
| 2013/0128815 A1* | 5/2013 | Scherzer | H04W 84/18 370/328 |
| 2013/0155876 A1* | 6/2013 | Potra | H04W 36/14 370/248 |
| 2013/0223308 A1 | 8/2013 | Chandra et al. | |
| 2013/0254779 A1 | 9/2013 | Dyba et al. | |
| 2013/0268632 A1* | 10/2013 | Baron | H04L 67/02 709/219 |
| 2013/0268666 A1* | 10/2013 | Wilson | H04L 67/02 709/225 |
| 2014/0068030 A1* | 3/2014 | Chambers | H04L 41/0809 709/220 |

OTHER PUBLICATIONS

"Cloud Services provide Wi-Fi access for restaurants and retail", Retrieved at <<http://news.thomasnet.com/fullstory/Cloud-Services-provide-Wi-Fi-access-for-restaurants-and-retail-608176>>, Jan. 18, 2012, 4 pages.

"Meraki for Service Providers: Captive Portal Configuration", Retrieved at <<http://www.meraki.com/lib/pdf/meraki_whitepaper_captive_portal.pdf>>, Meraki Solution Guide: Captive Portal Configuration, Jul. 2012, 13 pages.

"AirTight Launches Social Wi-Fi; Integration of Social Channels & Customized Captive Portals Merges Social & In-Store Engagement", Retrieved at <<http://www.marketwatch.com/story/airtight-launches-social-wi-fi-integration-of-social-channels-customized-captive-portals-merges-social-in-store-engagement-2013-04-29>>, Apr. 29, 2013, 4 pages.

"Solving the Guest access, device on boarding and Security Challenges of BYOD", Retrieved at <<http://www.xirrus.com/Products/Network-Services/Access-Manager>>, Jan. 15, 2013, 2 pages.

U.S. Appl. No. 14/081,196, "Network Selection Based On Customizing Crowdsourced Connection Quality Data", Filed: Nov. 15, 2013, 31 pages.

Venkitaraman, et al, "Session Aware Network Controlled Interface Selection for Multi-homed hosts", Retrieved at <<http://ieeexplore.ieee.org/stamp/stamp.jsp?arnumber=01311386>>, WCNC 2004/IEEE Communications Society, 2004 IEEE, pp. 1963-1968.

Ylitalo, et al., "Dynamic Network Interface Selection in Multihomed Mobile Hosts", Retrieved at <<http://www2.computer.org/plugins/dl/pdf/proceedings/hicss/2003/1874/09/187490315.pdf?template=1&loginState=1&userData=anonymous-IP1223872738208>>, Proceedings of the 36th Hawaii International Conference on System Sciences (HICSS '03), 2002 IEEE, 10 pages.

Sun, et al., "Towards Connectivity Management Adaptability: Context Awareness in Policy Representation and End-to-end Evaluation Algorithm", Retrieved at <<http://www.mediateam.oulu.fi/publications/pdf/615.pdf>>, MUM 2004, Oct. 27-29, 2004, College Park, Maryland, USA, 2004 ACM, 8 pages.

Non-Final Office Action for U.S. Appl. No. 12/333,331 (U.S. Pat. No. 8,407,721), dated Mar. 30, 2012, 16 pages.

Final Office Action for U.S. Appl. No. 12/333,331 (U.S. Pat. No. 8,407,721), dated Sep. 27, 2012, 7 pages.

Notice of Allowance for U.S. Appl. No. 12/333,331 (U.S. Pat. No. 8,407,721), dated Nov. 27, 2012, 9 pages.

Examiner-Initiated Interview Summary for U.S. Appl. No. 12/333,331 (U.S. Pat. No. 8,407,721), dated Nov. 27, 2012, 1 page.

* cited by examiner

CONTEXT-BASED SELECTION OF INSTRUCTION SETS FOR CONNECTING THROUGH CAPTIVE PORTALS

CROSS-REFERENCE TO RELATED APPLICATION

This application is related to a U.S. patent application entitled "Network Selection Based on Customizing Crowdsourced Connection Quality Data," which is incorporated by reference herein in its entirety.

BACKGROUND

The availability of network access points, such as wireless fidelity (Wi-Fi) hotspots, has increased significantly. Many of these access points are gated and require user intervention for connection to the Internet or other networks. For example, the user may be required to accept terms and conditions, provide an email address or hotel room number, etc. Some existing solutions attempt to help the users connect to networks, such as by managing multiple passwords with a single authentication personal identification number (PIN). Some other existing solutions attempt to locate Wi-Fi hotspots near the user. However, these solutions lack a mechanism for personalizing the connection of the user device to the Wi-Fi hotspots based on a context of the user device.

SUMMARY

Embodiments of the disclosure select, for a mobile computing device, at least one network access point and instructions for connecting to a network through the network access point. A cloud service accesses context describing the mobile computing device and obtains accounting data associated with the mobile computing device based on the accessed context. The cloud service selects one of a plurality of network access points available to the mobile computing device based at least on the obtained accounting data. The cloud service stores at least one set of the instructions for connecting to a network through the selected network access point. The cloud service provides the set of instructions corresponding to the selected network access point for replay by the mobile computing device to connect to the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
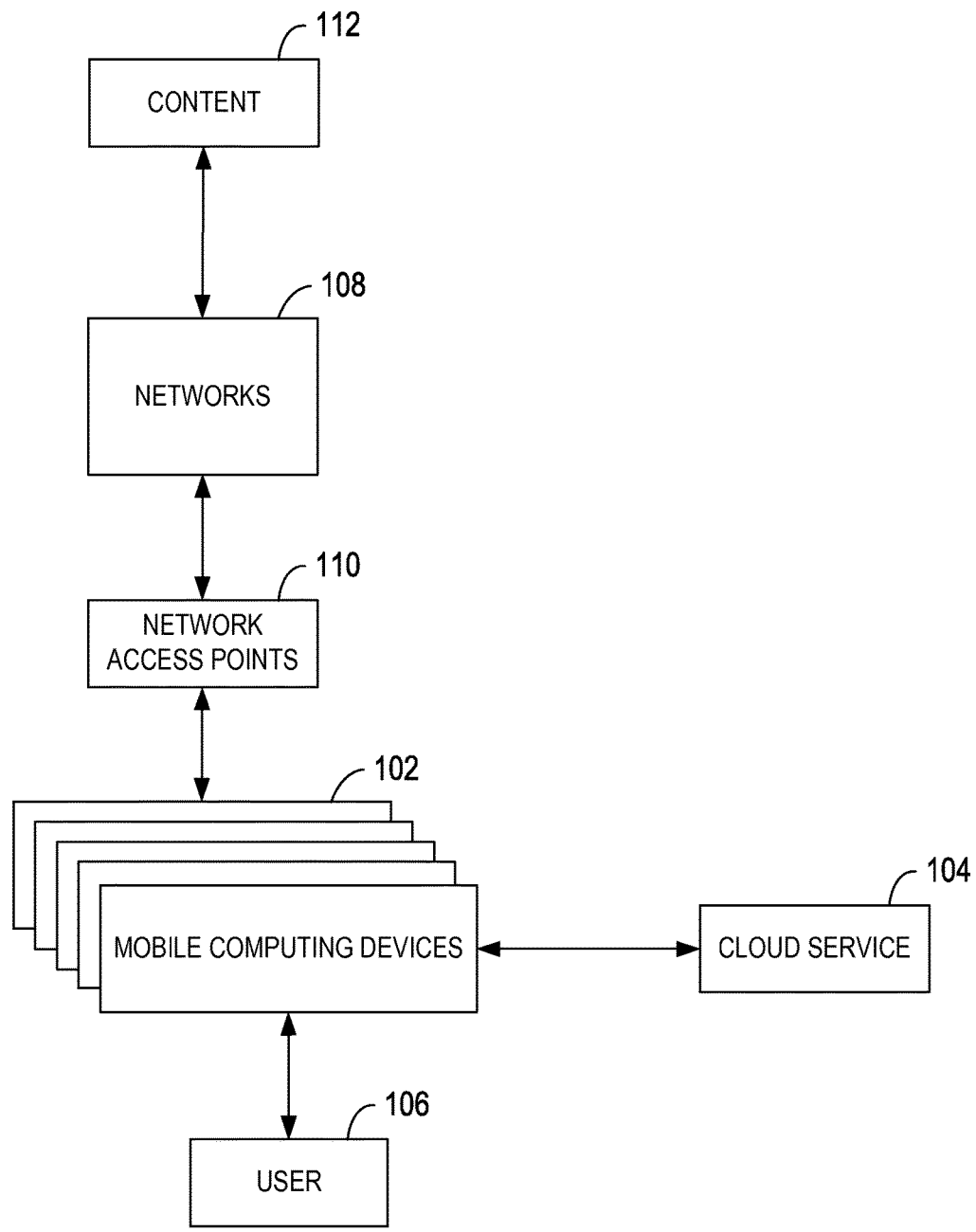
FIG. 1 is an exemplary block diagram illustrating a cloud service communicating with mobile computing devices that connect to networks.

Referring to the figures, embodiments of the disclosure enable personalization of network access point (NAP) 110 selection for a user 106 based on a context 302 of the user 106 and/or a user device (e.g., a mobile computing device 102). Some embodiments further personalize an instruction set (e.g., instruction set 206 and/or instruction set 412) for the user 106 to apply when attempting to connect to a network 108 through a captive portal associated with the NAP 110. As described further herein, personalizing the set of NAPs 110 and personalizing the instruction sets 206 may be performed by the mobile computing device 102 and/or a cloud service 104 in communication with the mobile computing device 102.

Aspects of the disclosure are operable with NAPs 110 that act as captive portals. As such, the NAPs 110 may be described as captive portals with click-through user interfaces. For example, when the user 106 of the mobile computing device 102 accesses the Internet at a hotel, the mobile computing device 102 is redirected to a captive portal web page. The captive portal web page may present advertisements, receive acceptance of terms and/or conditions of use, present confirmation screens, accept text input (e.g., shared keywords for gaining access to the networks 108), and the like before providing access to the network 108.

In some embodiments, the cloud service 104 crowdsources data sessions (e.g., logs) to learn how users 106 typically navigate through each of the NAPs 110. For example, the cloud service 104 reconstructs a series of events that occurred to connect the mobile computing devices 102 through the NAPs 110 to the networks 108. The cloud service 104 produces a sequenced instruction set 206 from the reconstructed series of events, and then personalizes the sequenced instruction set 206 for each user 106 and/or mobile computing device 102. The mobile computing device 102 replays the personalized instruction set 206 on behalf of the users 106 during subsequent connection attempts through the NAPs 110. Aspects of the disclosure thus eliminate the challenges, friction, and tediousness encountered when attempting to connect to the networks 108 by enabling connections in an automated and seamless manner.

While some embodiments may be described as implemented by a wireless fidelity (Wi-Fi) assist module, aspects of the disclosure are operable with any communications protocol. For example, the mobile computing device 102 may automatically connect to a free network through a Wi-Fi hotspot by accepting default terms of service (ToS), by accepting ToS with values inserted by scripts executing on the mobile computing device 102, by accepting ToS with text input values (e.g., electronic mail address, telephone number, name, etc.), and/or by providing a shared key (e.g., password).

Referring next to FIG. 1, an exemplary block diagram illustrates the cloud service 104 communicating with the mobile computing devices 102 that connect to the networks 108. In the example of FIG. 1, the user 106 interacts with the mobile computing device 102, or any other computing device of the user 106, to access content 112 via the network 108. The mobile computing device 102 connects to one or more of the networks 108 through one or more NAPs 110, such as a Wi-Fi beacon and a cellular tower. For each NAP 110, the mobile computing device 102 may execute one or more instructions, or otherwise perform a series of actions or commands 414, to gain access, via the NAP 110, to the network 108 associated with the NAP 110. After gaining access to the network 108 through the NAP 110, the mobile computing device 102 is able to transmit and receive the content 112. In this manner, the NAP 110 acts as a captive portal.

Communication between the mobile computing device 102 and other devices may occur using any protocol or mechanism over any wired or wireless connection. For example, the mobile computing device 102 may attempt to transmit and/or receive data over a Wi-Fi network, a cellular network, a satellite network, a whitespace network, or any network 108. In some embodiments, a NAP 110 is defined to include all NAPs 110 that share the same service set identifier (SSID) within a particular geographic area (e.g., 100-meter radius). For example, a plurality of NAPs 110 within an airport may share the same SSID.

Figure 2:
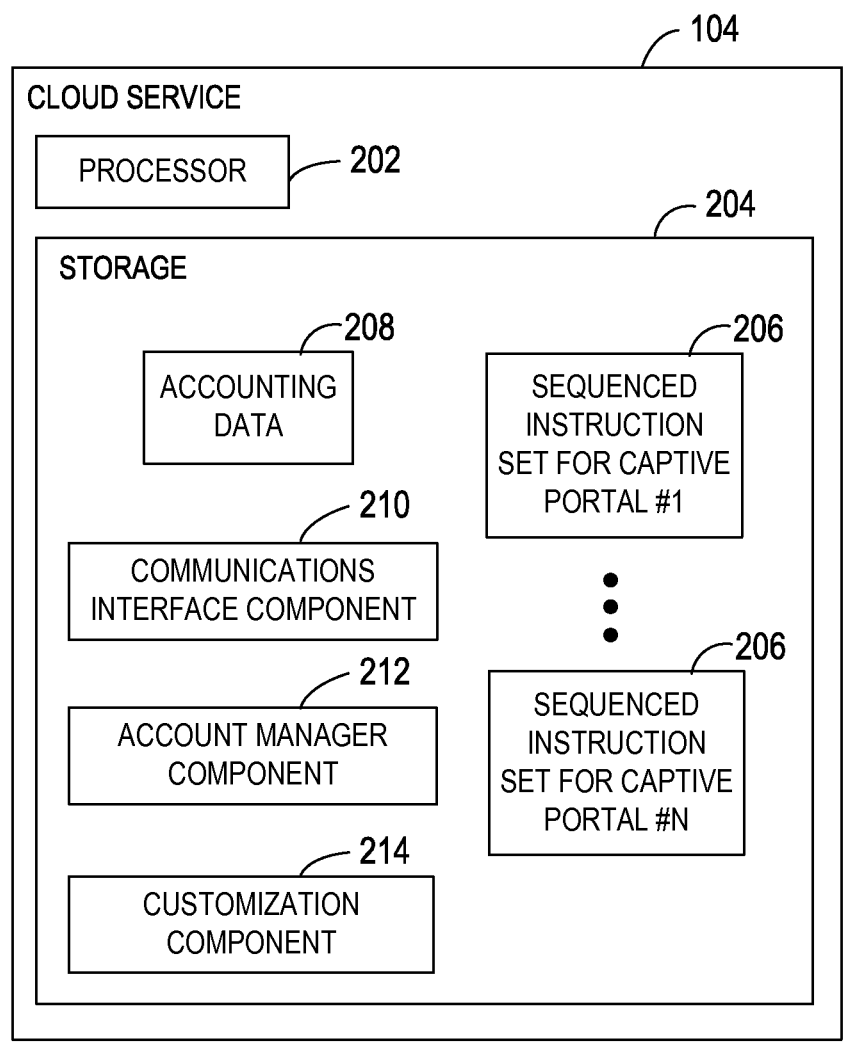
FIG. 2 is an exemplary block diagram illustrating a cloud service storing sets of sequenced instructions for connecting to captive portals.

Referring next to FIG. 2, an exemplary block diagram illustrates the cloud service 104 storing sets of sequenced instructions for connecting to captive portals. The cloud service 104 represents any device executing instructions (e.g., as application programs, operating system functionality, or both) to implement the operations and functionality associated with the cloud service 104. Such a device may also be a peer device to the mobile computing devices 102. The cloud service 104 may also represent a group of processing units or other computing devices. In another example, the cloud service 104 may include a mobile computing device or any other portable device, such as a mobile telephone, laptop, tablet, computing pad, netbook, gaming device, and/or portable media player. Alternatively or in addition, the cloud service 104 may include less portable devices such as desktop personal computers, kiosks, tabletop devices, industrial control devices, wireless charging stations, and electric automobile charging stations.

In some embodiments, the cloud service 104 has at least one processor 202 and storage 204. The processor 202 includes any quantity of processing units, and is programmed to execute computer-executable instructions for implementing aspects of the disclosure. The instructions may be performed by the processor 202 or by multiple processors executing within the cloud service 104, or performed by a processor external to the cloud service 104. In some embodiments, the processor 202 is programmed to execute instructions such as those illustrated in the figures (e.g., FIG. 3).

In some embodiments, the processor 202 represents an implementation of analog techniques to perform the operations described herein. For example, the operations may be performed by an analog computing device and/or a digital computing device.

The cloud service 104 further has one or more computer readable media such as the storage 204. The storage 204 includes any quantity of media associated with or accessible by the cloud service 104. The storage 204 may be internal to the cloud service 104 (as shown in FIG. 2), external to the cloud service 104 (not shown), or both (not shown). In some embodiments, the storage 204 includes read-only memory and/or memory wired into an analog computing device.

The storage 204 includes one or more of the instruction sets 206 for connecting to the networks 108 through the NAPs 110. For example, the storage 204 includes sequenced instruction sets 206 for connecting through the captive portals, such as captive portal #1 through captive portal #N. Each of the instruction sets 206 includes an ordered sequence of commands 414, such as for navigating web pages presented as part of the captive portals. The instruction sets 206 are generated from interaction data, such as manual portal assist data, describing actions performed by the users 106 when connecting to the networks 108. In some embodiments, the cloud service 104, or other entity, crowd-sources the interaction data from a plurality of the mobile computing devices 102. The interaction data represents any set of actions, operations, procedures, or other steps undertaken when attempting to establish the connection. In some embodiments, the interaction data includes request and response data from a web browser, such as hypertext transfer protocol (HTTP) request and HTTP response data. The cloud service 104 enumerates the instruction sets 206 (e.g., step-by-step) for connecting through the captive portal by iteratively processing the interaction data with machine learning algorithms.

In some embodiments, the sequenced instruction sets 206 include a set of extensible markup language (XML) instructions. The XML instructions include a sequence of verbs for execution to connect through the NAP 110. An example structure of a sequenced instruction set 206 is shown below:

```
<Script>
    <Operation xsi:type=Verbname>
        <Param1> Value1</Param1>
        <Param2> Value2</Param2>
    </Operation>
    <Operation xsi:type=Verbname>
        ...
    </Operation>
    ...
</Script>
```

An exemplary instruction set schema is described in Appendix A. However, aspects of the disclosure are operable with any instruction set schema.

The storage 204 further includes accounting data 208 describing access by the mobile computing devices 102 to the NAPs 110. The accounting data 208 may be received from mobile operators, service providers, the users 106, and the like, and may be per device, application 406, user 106, billing entity, protocol, and the like. The accounting data 208 describes, for example, accounts, subscriptions 410, billing information, and/or other financial information of the users 106 and/or mobile computing devices 102. In some embodiments, the accounting data 208 identifies the networks 108 to which the user 106 and/or mobile computing device 102 has access, a frequency of previous access, an amount of data consumption remaining under a data plan, an amount of data consumed under the data plan, a type of data consumption remaining under the data plan, details of the data plan such as free or reduced rates for nights and weekends, etc. The accounting data 208 may also describe multi-tier access to the same NAP 110, in which the NAP 110 provides different behavior for different plans or devices. The accounting data 208 may be associated with a token having a time-to-live tag. In some embodiments, the account data 208 includes network quality data.

The cloud service 104 further stores computer-executable components in storage 204. The components include a communications interface component 210, an account manager component 212, and a customization component 214. In some embodiments, the communications interface component 210 includes a network interface card and/or computer-executable instructions (e.g., a driver) for operating the network interface card. Operation of these components, when executed, is described below with reference to FIG. 3.

Figure 3:
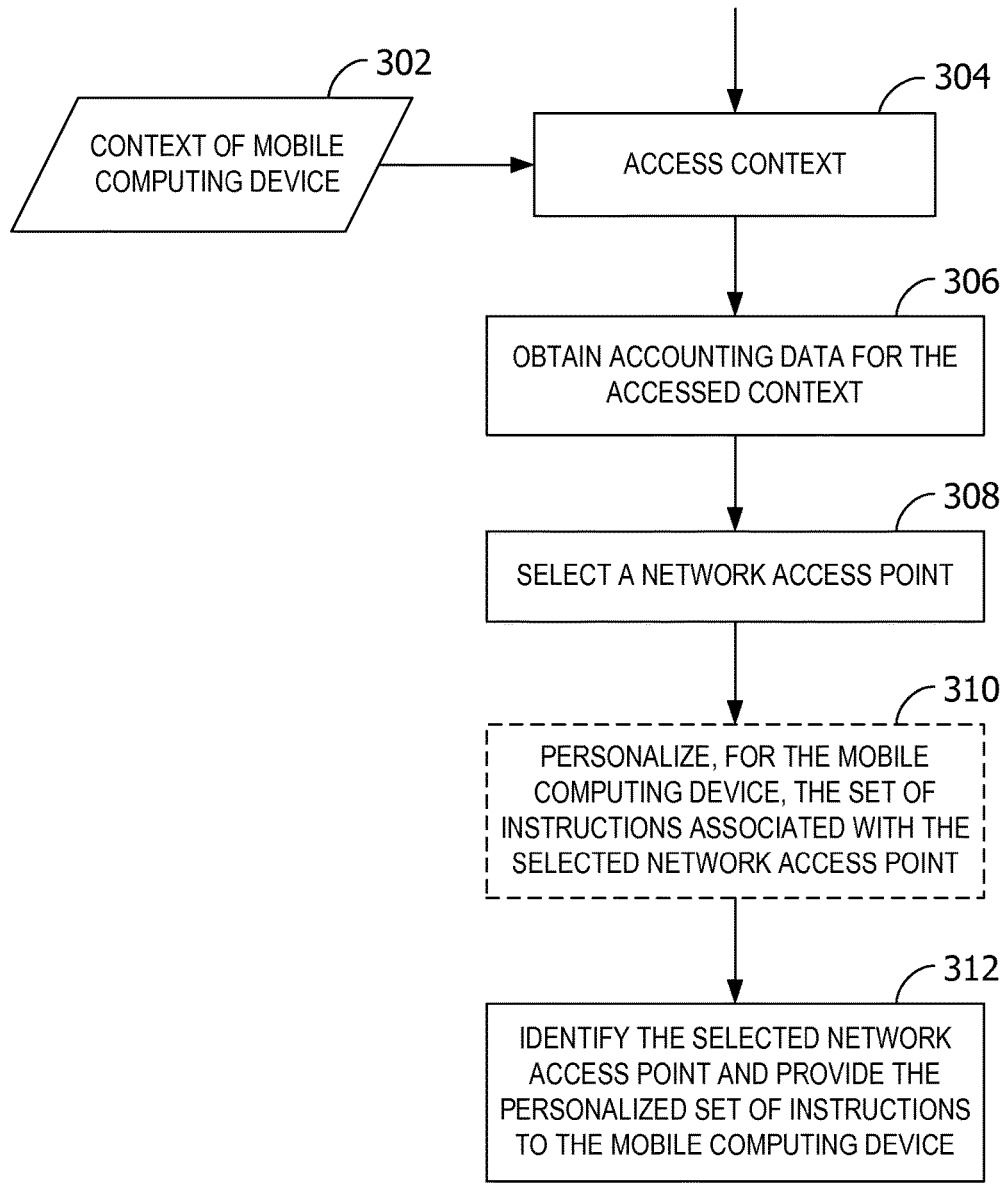
FIG. 3 is an exemplary flow chart illustrating operation of the cloud service to select an instruction set for a mobile computing device to connect to a network through a captive portal.

Referring next to FIG. 3, an exemplary flow chart illustrates operation of the cloud service 104 to select one of the instruction sets 206 for the mobile computing device 102 to connect to the network 108 through the captive portal. The operations illustrated in FIG. 3 are described with reference to execution by the cloud service 104. However, aspects of the disclosure contemplate execution of the operations by other devices or processors, such as by one or more of the mobile computing devices 102.

At 304, the cloud service 104 accesses context 302 from the mobile computing device 102. For example, the cloud service 104 receives the context 302 from the mobile computing device 102 as part of a request to connect through one or more of the captive portals detected by the mobile computing device 102. In another example, the cloud service 104 receives the context 302 before the mobile computing device 102 is ready to connect through a captive portal. In such an example, the mobile computing device 102 requests the instruction sets 206 for a plurality of captive portals that the mobile computing device 102 may encounter at some point in time.

The context 302 describes the mobile computing device 102 and identifies one or more of the NAPs 110 detected near the mobile computing device 102, in some embodiments. The context 302 includes, for example, user context, a device context, or a network context. The context 302 describes the current (or recent) operating conditions and/or parameters of the mobile computing device 102. For example, the context 302 represents measurements of signals available to the mobile computing device 102. In some embodiments, the context 302 includes, but is not limited to, time, date, a battery level, signal strengths for the networks 108, network types for the networks 108, network speeds, a location of the mobile computing device 102, a user identifier, a user profile, device conditions, user preferences, user dwell time on the networks 108, a usage scenario, application identifiers of the executing applications 406, device movement (e.g., from an accelerometer, gyroscope, and/or a global positioning system), weather local to the mobile computing device 102, device type and build, operating system type and build, data transmission costs, and/or a remaining network data consumption amount under a data plan. The context 302 may be continually updated by the mobile computing device 102, or generated, captured, and/or determined as needed when attempting to connect through the captive portal.

At 306, the cloud service 104 obtains the accounting data 208 associated with the mobile computing device 102 based on the accessed context 302. For example, the cloud service 104 identifies a media access control (MAC) address of the mobile computing device 102, an Internet Protocol (IP) address of the mobile computing device 102, a serial number, a device make and model, a user name, a user email address, an account number, and/or any other identifier associated with the mobile computing device 102 and/or the user 106. The cloud service 104 uses the identifier as an index into a database, or other storage, of the accounting data 208 to obtain the accounting data 208 for the mobile computing device 102 and/or the user 106.

At 308, the cloud service 104 selects at least one of the NAPs 110 proximate to the mobile computing device 102 (and identified in the context 302) based on the context 302, such as the accounting data 208. For example, the cloud service 104 may select the NAP 110 to which the user 106 has a subscription, the NAP 110 having a highest connection quality score for data transmissions, the NAP 110 to which the user 106 has previously connected, the NAP 110 for which the cloud service 104 stores one of the instruction sets 206, etc. In general, the cloud service 104 selects the NAP 110 expected to provide the best connection with the lowest cost without sacrificing the user experience.

In another example, the cloud service 104 selects one of the NAPs 110 based on the device make, model, and/or manufacturer of the mobile computing device 102. In such an example, the cloud service 104 may select the NAP 110 that has a business agreement with the device manufacturer, rather than selecting another nearby NAP 110. In yet another example, a hotel, restaurant, or other business entity may offer one NAP 110 for customers or guests of the entity, and a different NAP 110 for visitors. In such an example, the cloud service 104 selects the NAP 110 appropriate for the user 106 based on user information, such as whether the user 106 is a registered guest, customer, or visitor.

In some embodiments, the cloud service 104 selects the NAP 110 based on a social graph of the user 106 and/or the mobile computing device 102. The social graph reflects a relationship of the user 106 to other users 106, and/or a relationship of the mobile computing device 102 to other mobile computing devices 102. For example, preference may be given to the networks 108 that members in a social graph have used, or have liked.

At 312, the cloud service 104 identifies, to the mobile computing device 102, the selected NAP 110 and provides, to the mobile computing device 102, the instruction set 206 associated with the selected NAP 110 for replay by the mobile computing device 102 to connect to the network 108 through the NAP 110. In some embodiments, the cloud service 104 distributes the instruction set 206 to the mobile computing device 102. In other embodiments, the cloud service 104 provides the instruction set 206 to a distribution service that communicates with the mobile computing device 102.

In some embodiments, the cloud service 104 distributes the instruction set 206 to the mobile computing device 102 via one or more geospatial tile data structures (e.g., "tiles"). Each tile may store the instruction sets 206 associated with the selected NAP 110, and possibly other instruction sets 206 associated with other NAPs 110 within a particular geographic area (e.g., within one square mile) of the mobile computing device 102. As an example, each tile stores information such as the SSID and basic service set identifier (BSSID) of the NAP 110, the location of the NAP 110, and the instruction set 206 for connecting to the network 108 through the NAP 110. As a further example, the tiles may store connection quality data for one or more of the networks 108 available within the geographic area. The connection quality data describes the anticipated, expected, and/or predicted experience of the applications 406 executing on the mobile computing device 102 when transmitting and/or receiving data over that network 108. One or more of the tiles may be downloaded (e.g., once a day) by the mobile computing device 102 for caching.

In some embodiments, prior to distributing the instruction set 206 associated with the selected NAP 110 to the mobile computing device 102, the cloud service 104 personalizes at 310 the instruction set 206 based on the context 302 of the mobile computing device 102. In some embodiments, the cloud service 104 modifies the sequence of instructions within the set based on the accounting data 208. For example, the cloud service 104 may add instructions to the instruction set 206, such as by inserting an instruction to provide a pre-existing login and password to connect through the captive portal. In another example, the cloud service 104 may remove instructions from the instruction set 206, such as by deleting an instruction that is not applicable for the particular user 106 and/or mobile computing device 102. In this manner, the cloud service 104 personalizes the instruction set 206 for the mobile computing device 102 and/or the user 106 such that execution of the personalized instruction set 206 enables the user 106 to navigate a plurality of web pages of the captive portal to connect to the network 108 through the captive portal.

Personalization may also include modifying the instructions based on a real-time analysis of the ToS associated with the selected NAP 110. For example, in addition to accessing the context 302 of the mobile computing device 102, the cloud service 104 may also receive ToS associated with the NAPs 110 detected by the mobile computing device 102. The cloud service 104 may parse the ToS associated with each of the NAPs 110 to identify or derive limitations for connecting to the NAPs 110. In this manner, the cloud service 104 performs real-time identification of restrictions (e.g., must purchase a coffee at a coffee house to gain access), and personalizes the instructions based on the identified restrictions. Parsing the ToS, or other session data, may be performed by a portal analysis tool. Such a tool analyzes the session data to display a Wi-Fi portal session and its properties. Exemplary properties include the SSID of the NAP 110, along with elements on the Wi-Fi portal web page (e.g., a ToS checkbox, a connect button, a text input form asking for the user's email, etc.).

Another example of personalization includes selecting one or more advertisements for the user 106 based on the context 302 data, such as the accounting data 208. For example, advertisements relating to the context 302 data are selected, such as advertisements for establishments located near the mobile computing device 102, advertisements associated with the make/model of the mobile computing device 102, advertisements associated with a profile of the user 106, and the like. Additional instructions are then inserted into the instruction set 206 to display the selected advertisements to the user 106 when connecting through the captive portal.

Personalization of the instruction set 206 may further include selecting or adjusting a quality of service of the connection, selecting a network protocol, and/or securing the connection between the mobile computing device 102 and the network 108.

Another example of personalization includes modifying the instructions based on the cellular provider or mobile operator associated with the mobile computing device 102. For example, if the mobile computing device 102 is associated with a particular mobile operator that has a contractual arrangement with one of the detected NAPs 110, the cloud service 104 may select that NAP 110 for connection as the user 106 will be able to connect through the captive portal based on the affiliation with the mobile operator.

In this manner, the cloud service 104 may conclude, for the particular user 106, to only display NAPs 110 offering VPN security, to only display NAPs 110 with free Wi-Fi access, etc.

In some embodiments, the components illustrated in FIG. 2 execute to perform one or more of the operations illustrated in FIG. 3. For example, the communications interface component 210, when executed by the processor 202 of the cloud service 104, causes the processor 202 to receive, from the mobile computing device 102, the context 302 describing the mobile computing device 102. The account manager component 212, when executed by the processor 202, causes the processor 202 to access the accounting data 208 associated with the mobile computing device 102 based on the context 302 received by the communications interface component 210. The account manager further operates to select one of the NAPs 110 based at least on the accessed accounting data 208. The customization component 214, when executed by the processor 202, causes the processor 202 to personalize the instruction set 206 by modifying the ordered sequence of commands 414 within the instruction set 206. The communications interface component 210 further identifies, to the mobile computing device 102, the selected NAP 110 and provides the personalized instruction set 206 for replay by the mobile computing device 102 to connect to the network 108.

In tile-based embodiments, the communications interface component 210 further embeds an identifier of the selected NAP 110 and the instruction set 206 in at least one of the tiles for distribution to the mobile computing device 102. The communications interface component 210 may further perform optimization operations on each tile, such as de-duplicating the instruction set 206 to reduce a size of the tile for transmission. De-duplication includes, for example, hashing each instruction and then replacing duplicate instructions having the same hashed value with a pointer value.

In some embodiments, the report component, when executed by the processor 202, causes the processor 202 to generate a report for the mobile computing device 102 based on the personalizing performed by the customization component 214. For example, the report maintains a log of the changes made to the instruction set 206 during personalization. The log of changes may be leveraged by the cloud service 104 when personalizing other instruction sets 206 (e.g., for other NAPs 110 to which the mobile computing device 102 attempts to connect through).

Figure 4:
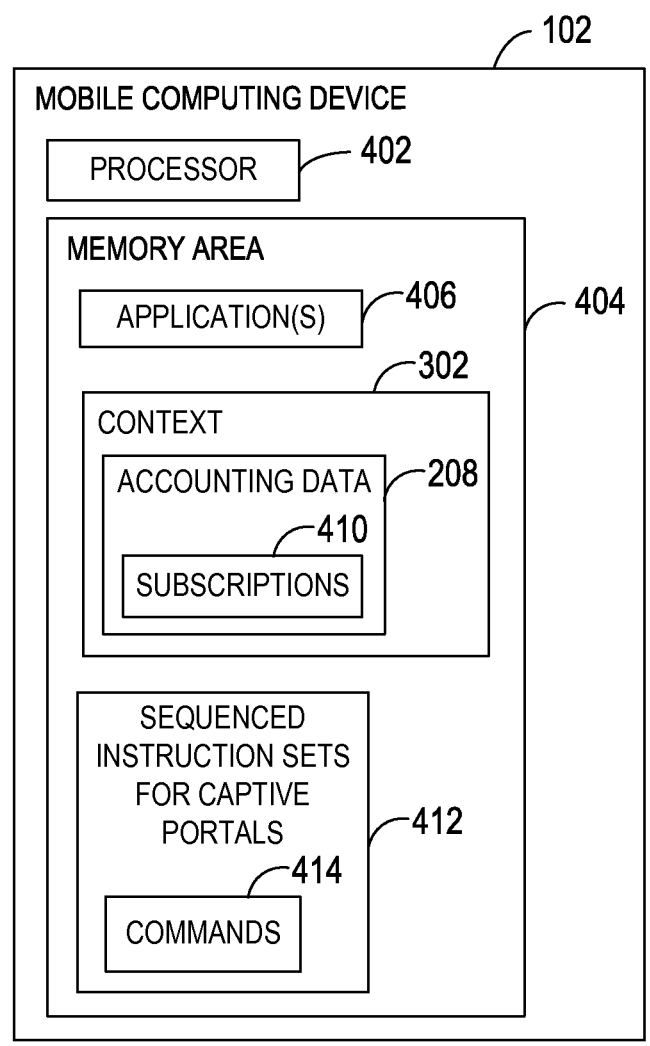
FIG. 4 is an exemplary block diagram illustrating a mobile computing device storing accounting data of a user.

Referring next to FIG. 4, an exemplary block diagram illustrates the mobile computing device 102 storing the accounting data 208 of the user 106. In the example of FIG. 4, the mobile computing device 102 represents a system for modifying and executing sequenced instructions to connect to the network 108 through the captive portal. In such an example, the mobile computing device 102 performs the modification and execution without contacting the cloud service 104. Such embodiments occur when the mobile computing device 102 is unable or unwilling to contact the cloud service 104, such as when the mobile computing device 102 desires to reduce network transmissions (e.g., when remaining network data consumption under a data usage plan of the user 106 has been exhausted).

The mobile computing device 102 represents any device executing instructions (e.g., as application programs, operating system functionality, or both) to implement the operations and functionality associated with the mobile computing device 102. In some embodiments, the mobile computing device 102 includes a mobile telephone, laptop, tablet, computing pad, netbook, gaming device, and/or portable media player. Additionally, the mobile computing device 102 may represent a group of processing units or other computing devices.

In some embodiments, the mobile computing device 102 has at least one processor 402 and a memory area 404. The processor 402 includes any quantity of processing units, and is programmed to execute computer-executable instructions for implementing aspects of the disclosure. The instructions may be performed by the processor 402 or by multiple processors executing within the mobile computing device 102, or performed by a processor external to the mobile computing device 102. In some embodiments, the processor 402 is programmed to execute instructions such as those illustrated in the figures (e.g., FIG. 5).

In some embodiments, the processor 402 represents an implementation of analog techniques to perform the operations described herein. For example, the operations may be performed by an analog computing device and/or a digital computing device.

The mobile computing device 102 further has one or more computer readable media such as the memory area 404. The memory area 404 includes any quantity of media associated with or accessible by the mobile computing device 102. The memory area 404 may be internal to the mobile computing device 102 (as shown in FIG. 4), external to the mobile computing device 102 (not shown), or both (not shown). In some embodiments, the memory area 404 includes read-only memory and/or memory wired into an analog computing device.

The memory area 404 stores, among other data, one or more of the applications 406. The applications 406, when executed by the processor 402, operate to perform functionality on the mobile computing device 102. Exemplary applications 406 include mail application programs, web browsers, calendar application programs, address book application programs, messaging programs, media applications, location-based services, search programs, and the like. The applications 406 may communicate with counterpart applications or services such as web services accessible via the network 108. For example, the applications 406 may represent downloaded client-side applications that correspond to server-side services executed by the cloud service 104.

The memory area 404 further stores the context 302 associated with the mobile computing device 102. As described above, the context 302 includes the accounting data 208, in some embodiments. The accounting data 208 identifies, for example, subscriptions 410 of the user 106 and/or the mobile computing device 102. The subscriptions 410 define access by the user 106 to at least one of the networks 108 (e.g., contractual agreements between the user 106 and service providers). The accounting data 208 may also describe a history of previous access by the user 106 to the networks 108. In this manner, the context 302 identifies the NAPs 110 to which the user 106 has previously connected.

The memory area 404 further stores instruction sets 412 for connecting to the networks 108 through the NAPs 110. Each instruction set 412 includes a series of commands 414 for execution by the mobile computing device 102. The instruction sets 412 stored in the memory area 404 represent the instruction sets 206 previously received from the cloud service 104, and/or instruction sets generated directly by the mobile computing device 102 (e.g., by performing one or more of the operations illustrated in FIG. 3).

In some embodiments, the memory area 404 stores at least two instruction sets 412 for the same NAP 110. The two instruction sets 412 correspond to a free path and a paid path through the same captive portal. The free path represents a set of actions for obtaining access to the network 108 without paying a fee. The paid path represents a different set of action for obtaining access to the network 108 through the same NAP 110 as the free path, but by paying a fee. For example, the paid path may be taken by the users 106 who pay a monthly fee to a service provider, or who have purchased a particular amount of time on the network 108 (e.g., hourly pass, daily pass, etc.). In operation, the mobile computing device 102 selects either the free path or the paid path when selecting the instruction set 412 based on the accounting data 208.

Figure 5:
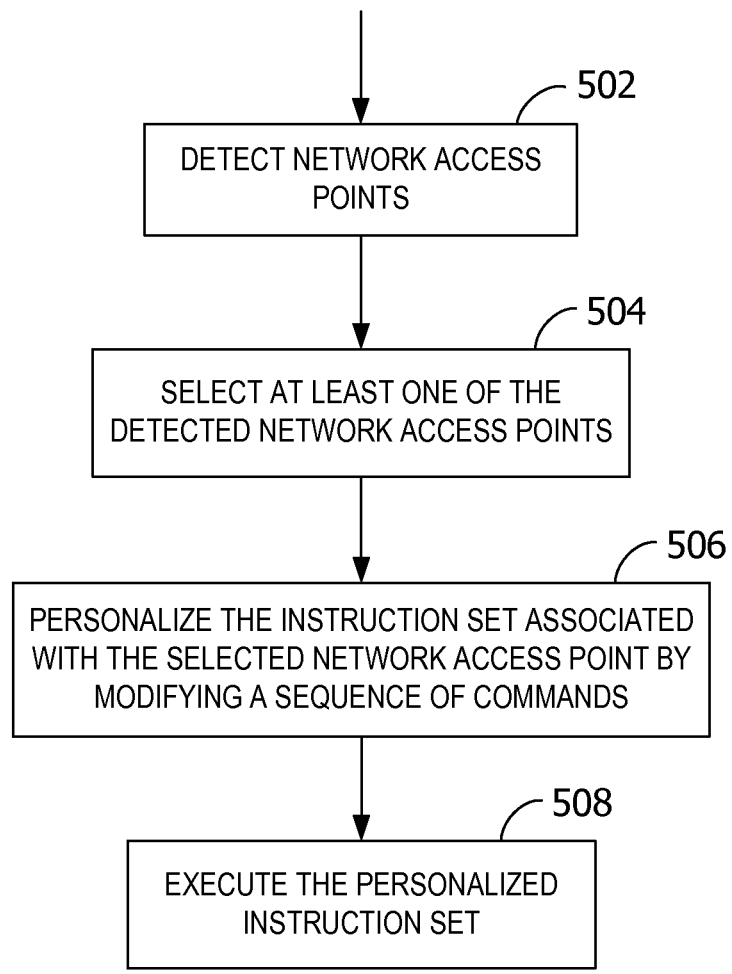
FIG. 5 is an exemplary flow chart illustrating operation of a mobile computing device to select and personalize an instruction set to connect to a network through a captive portal.

Referring next to FIG. 5, an exemplary flow chart illustrates operation of the mobile computing device 102 to select and personalize one of the instruction sets 412 to connect to the network 108 through the captive portal. The operations illustrated in FIG. 5 are described with reference to execution by the mobile computing device 102. However, aspects of the disclosure contemplate execution of the operations by other devices or processors, such as by any device attempting to connect through the captive portal.

At 502, the mobile computing device 102 detects one or more of the NAPs 110 available to the mobile computing device 102. At 504, the mobile computing device 102 selects one of the detected NAPs 110 based on the context 302 stored in the memory area 404. For example, the mobile computing device 102 selects one of the detected NAPs 110 based on the subscriptions 410 of the user 106. In such an example, the mobile computing device 102 may rank the detected NAPs 110 based on whether or not there is a corresponding subscription 410 stored in the memory area 404, and then select one of the NAPs 110 based on the ranking.

In some embodiments, the mobile computing device 102 (or the cloud service 104) classifies each of the detected NAPs 110 as simple or complex based on the amount of interaction required to connect through the NAP 110. The NAPs 110 may also be ranked, classified, categorized, or otherwise sorted by type, ToS, user display type (e.g., device form factor), reputation, connection quality score, security options, and the like. The mobile computing device 102 may also recognize and label those NAPs 110 that are part of a larger network of NAPs 110 (e.g., distributed NAPs 110 associated with a business entity). Other exemplary classifications identify whether the NAP 110 is a public open hotspot (e.g., no security), a secure mobile operator hotspot (e.g., the mobile computing device 102 needs plug-in from mobile operator for authentication), a Wi-Fi shared-credential hotspot (e.g., an open or secure hotspot shared to the user 106), or a manually connected network (e.g., an open or secure manually configured network).

The mobile computing device 102 (or the cloud service 104, in some embodiments) then selects one of the detected NAPs 110 based on the classifications. For example, the mobile computing device 102 may rank each of the NAPs 110 based on the level of restrictions derived from the ToS, and then select the NAP 110 with the least restrictive ToS.

At 506, the mobile computing device 102 personalizes the instruction set 412 associated with the selected NAP 110 by modifying the ordered sequence of commands 414 within the instruction set 412 based on the context 302. At 508, the mobile computing device 102 executes the personalized instruction set 412 to connect to the network 108 through the selected NAP 110.

Figure 6:
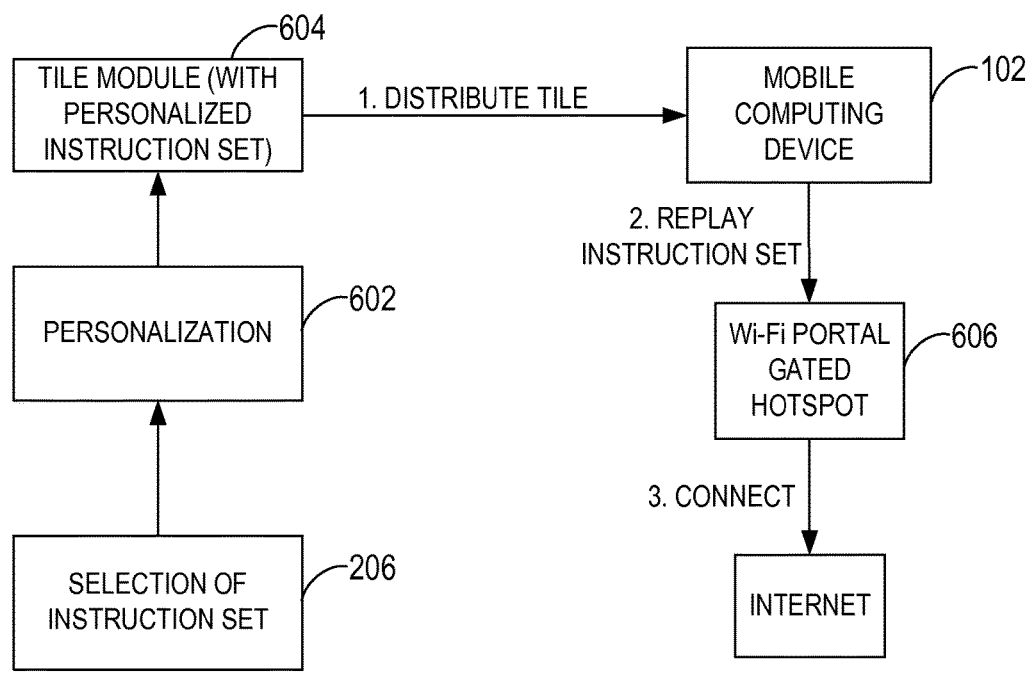
FIG. 6 is an exemplary block diagram illustrating personalization and distribution of a sequenced instruction set from a cloud service to a mobile computing device.

Referring next to FIG. 6, an exemplary block diagram illustrates personalization and distribution of the sequenced instruction set 206 from the cloud service 104 to the mobile computing device 102. While a particular sequence of operations is illustrated in FIG. 6, other sequences are within the scope of the disclosure.

In the example of FIG. 6, the clouds service selects the instruction set 206 performs personalization 602 by the cloud service 104 for connection to a Wi-Fi portal gated hotspot 606. The personalized instruction set 206 is distributed to the mobile computing device 102 by, for example, a tile module 604. The mobile computing device 102 replays the personalized instruction set 206 from the tile when connecting to the Wi-Fi portal gated hotspot 606 to connect to the Internet, or other network 108.

Additional Examples

In some embodiments, the cloud service 104 further personalizes the instruction set 206 associated with the selected NAP 110 by modifying the instruction set 206 to identify, to the user 106 before or after connecting through the captive portal, those applications 406 on the mobile computing device 102 that are allowed to send/receive data through the captive portal. For example, messaging applications and gaming applications may be identified as allowed, whereas video streaming applications may be identified are not allowed.

After connecting through the captive portal, some scenarios contemplate sharing tokens or credentials defining the connection with additional mobile computing devices 102 of the user 106. For example, once the user 106 connects through the captive portal on a laptop, aspects of the disclosure share the credentials associated with the connection with a mobile telephone and tablet of the user 106, when those additional devices attempt to connect to the same network 108. In this manner, those additional devices are able to connect without replaying the same instructions the laptop executed. Similarly, the credentials may be shared with friends and family of the user 106 to use a remaining balance of access (e.g., remaining network data consumption or time). In some embodiments, such sharing occurs after payment between the user 106 and the friends or family, thereby amortizing the cost of access for the user 106.

An example language set for the sequenced instruction set 206 is next described. Aspects of the disclosure, however, are operable with any set of verbs, operands, parameters, etc. Exemplary verbs include Probe for Connectivity (PC), Follow Redirect (FR), Follow Anchor (FA), Submit Form (SF), Navigate To (NT), and Submit Post String (SPS).

The PC verb may be the first verb in the instruction set 206, and probes for network connectivity by attempting to connect to a network location (e.g., a HTTP address). The FR verb follows the redirect from a previous browser page and retrieves a redirected browser page. Exemplary parameters to this verb include delay (e.g., a time delay before executing this verb), a redirect type (e.g., HttpRedirect, HtmlMetaRefresh, JavaScriptRefresh, etc.), and a timeout (e.g., a timeout for receiving a response from the web server). In XML, the FR verb may appear as shown below:

```
<Operation xsi:type="FollowRedirect">
    <Delay>0</Delay>
    <RedirectType>1</RedirectType>
    <Timeout>5000</Timeout>
</Operation>
```

The FA verb follows an anchor from a previous page and retrieves a target page identified by the anchor. Exemplary parameters to this verb include delay (e.g., a time delay before executing this verb), an anchor identifier (e.g., a zero-based index to the anchor on the previous page), and a timeout (e.g., a timeout for receiving a response from the web server). In XML, the FA verb may appear as shown below:

```
<Operation xsi:type="FollowAnchor">
    <Delay>0</Delay>
    <AnchorId>1</AnchorId>
    <Timeout>5000</Timeout>
</Operation>
```

The SF verb submits a form on a previous page and retrieves the response. The SF verb looks at the action attribute in the form to identify the post uniform resource location (URL). Exemplary parameters to this verb include delay (e.g., a time delay before executing this verb), a form identifier (e.g., a zero-based index to the forms on the previous page), a submit option (e.g., a flag to indicate how to obtain contents for the post request), one or more key-value pairs (e.g., a set of key-value pairs to include in the post request), and a timeout (e.g., a timeout for receiving a response from the web server). The submit option parameter may appear as shown below:

```
public enum FormFieldSubmitOption
{
    None,
    UseDefaultValues,
    EmptyValues,
    OverrideValues,
    SpecifiedPairsOnly,
}
```

Exemplary key-value pairs include one or more of the following predefined expressions which are replaced by the mobile computing device 102: %WPEmail% replaced with an email address of the user 106, %WPPhone% replaced with a telephone number of the user 106, %WPFirstName% replaced with a first name of the user 106, %WPLastName% replaced with a last name of the user 106, %WPName% replaced with a complete name of the user 106, %WPIPAddress% replaced with the IP address of the mobile computing device 102, and %WPMacAddress% replaced with the MAC address of the mobile computing device 102.

In XML, the SF verb may appear as shown below:

```
<Operation xsi:type="SubmitForm">
    <Delay>0</Delay>
    <FormId>0</FormId>
    <SubmitOption>1</SubmitOption>
    <KeyValuePairs>
        <KeyValuePair key="name" value="Anna"/>
        <KeyValuePair key="accessCode" value="A973BEEBD3BE78DD"/>
    </KeyValuePairs>
    <Timeout>5000</Timeout>
</Operation>
```

The NT verb retrieves the contents of the target page. Exemplary parameters to this verb include delay (e.g., a time delay before executing this verb), address (e.g., the destination URL), and timeout (e.g., a timeout for receiving a response from the web server). The address parameter may contain one or more predefined expressions in the query string, which are replaced by the mobile computing device 102 with the respective values. In XML, the NT verb may appear as shown below:

```
<Operation xsi:type="NavigateTo">
    <Delay>0</Delay>
    <Address>http://www....com</Address>
    <Timeout>5000</Timeout>
</Operation>
```

The SPS verb is used to submit the specified post string to the specified address. Exemplary parameters to this verb include delay (e.g., a time delay before executing this verb), address (e.g., the destination URL), one or more key-value pairs (e.g., a set of key-value pairs to include in the post request), and a timeout (e.g., a timeout for receiving a response from the web server). The address parameter may contain one or more predefined expressions in the query string, which are replaced by the mobile computing device 102 with the respective values. In XML, the SPS verb may appear as shown below:

```
<Operation xsi:type="SubmitPostString">
    <Delay>0</Delay>
    <Address>http://www....com</Address>
    <KeyValuePairs>
        <KeyValuePair key="name" value="Anna"/>
        <KeyValuePair key="accessCode"
value="A973BEABD3BE45ED" encrypted="true"/>
    </KeyValuePairs>
    <Timeout>5000</Timeout>
</Operation>
```

At least a portion of the functionality of the various elements in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "NFC" as used herein refers, in some embodiments, to a short-range high frequency wireless communication technology for the exchange of data over short distances.

While no personally identifiable information is tracked by aspects of the disclosure, embodiments have been described with reference to data monitored and/or collected from the users 106. In some embodiments, notice may be provided to the users 106 of the collection of the data (e.g., via a dialog box or preference setting) and users 106 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware. Exemplary computer storage media include hard disks, flash drives, and other solid-state memory. In contrast, communication media embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user 106 in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for modifying and executing sequenced instructions to connect to one of the networks 108 through a captive portal. For example, one or more of the embodiments contemplate means for detecting at least one of the NAPs 110 available to the mobile computing device 102, selecting one of the detected NAPs 110 based on the context 302, personalizing the instruction set 206 associated with the selected NAP 110 by modifying the ordered sequence of commands within the instruction set 206 based on the context 302, and executing the personalized instruction set 206 to connect to the network 108 through the selected NAP 110.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

An exemplary instruction set schema is next described. Each instruction set 206 is identified by an instruction identifier (ID). To de-duplicate common instruction sets for Wi-Fi portal networks, a tile contains networks with associated instruction IDs. In some embodiments, a mapping table is included in the tile that contains the actual instruction sets with all the instruction IDs tagged to at least one of the networks.

Two exemplary instruction sets are shown in the example tile below, one with instruction ID 10000 and the other with instruction ID 10001.

```
{
    "Tiles": [{
        "Quadkey": "02123003022112122",
        "Version": 100,
        "NWLatitude": 0.0,
        "NWLongitude": 0.0,
        "SELatitude": 0.0,
        "SELongitude": 0.0,
        "ValidTo": "2013-06-20T02:46:57.325573Z",
        "Networks": [{
            "Type": 9,
            "Ssid": "ACT_OPEN_SSID#100",
            "Bssids": ["02-74-B6-7C-9A-D1","02-74-B6-7C-9A-D2","02-74-B6-7C-9A-D3","02-74-B6-7C-9A-D4","02-74-B6-7C-9A-D5","02-74-B6-7C-9A-D6","02-74-B6-7C-9A-D7","02-74-B6-7C-9A-D8","02-74-B6-7C-9A-D9","02-74-B6-7C-9A-D0"],
            "Score": 3.5,
            "DataCollectionNeeded": 0.5,
            "AutoConnectConfig": {
                "Security": 1,
                "Credentials": "Credentials",
                "WpaIds": [10000, 10001]
            },
            "MobileOperators": ["TestOperator1","TestOperator2"]
        },
        {
            "Type": 10,
            "Ssid": "ACT_OPEN_SSID#101",
            "Bssids": ["02-74-B6-7C-9A-D2","02-74-B6-7C-9A-D1"],
            "Score": 3.4,
            "DataCollectionNeeded": 0.6,
            "AutoConnectConfig": {
                "Security": 1,
                "Credentials": "Credentials",
                "WpaIds": [10000]
            },
            "MobileOperators": ["TestOperator1","TestOperator2"]
        }],
        "IsPartial": false,
        "WifiPortalAssistants": [{
            "Id": 10000,
            "Instruction": "WPA-10000XXXXXXXXXXXXXXXXXXXXXXXXXXX"
        },
        {
            "Id": 10001,
            "Instruction": "WPA-10001XXXXXXXXXXXXXXXXXXXXXXXXXXX"
        }]
    }],
    "UnservedIndexes": [ ]
}
```

What is claimed is:

1. A system for modifying and executing sequenced instructions to connect to a network through a captive portal, said system comprising:
 a memory area storing context associated with a mobile computing device, the context including accounting data comprising credentials for a user to access one or more network access points, the memory area further storing instruction sets for connecting to networks through network access points, the instruction sets including ordered sequences of commands for navigating the mobile computing device through a plurality of web pages to connect the mobile computing device to the network access points on behalf of the user using the context for the user and data describing how other users connected respective mobile devices to the network access point; and
 a processor coupled to the memory area, the processor programmed to:
  detect one or more of the network access points available to the mobile computing device;
  select one of the detected network access points based on the context stored in the memory area;
  personalize the instruction set associated with the selected network access point by modifying the ordered sequence of commands within the instruction set based on the context and the data describing how the other users connected to the selected network access point; and
  execute the personalized instruction set on behalf of the user, the execution navigating the mobile computing device through a collection of web pages to connect to the network through the selected network access point for a first time for the user.

2. The system of claim 1, wherein the accounting data stored in the memory area identifies subscriptions of a user of the mobile computing device, the subscriptions defining access by the user to at least one of the networks.

3. The system of claim 2, wherein the processor selects the one of the detected network access points based on the subscriptions.

4. The system of claim 2, wherein the processor is further programmed to rank the detected one or more of the network access points based on the subscriptions.

5. The system of claim 1, wherein the accounting data stored in the memory area describes a history of previous access by a user of the mobile computing device to the selected network.

6. The system of claim 5, wherein the processor is further programmed to receive, from a cloud service, the instructions sets in a geospatial tile data structure.

7. The system of claim 1, wherein the memory area stores at least two instruction sets for one of the networks, the at least two instruction sets corresponding to a free path through a captive portal and to a paid path through a captive portal.

8. The system of claim 7, wherein the processor is further programmed to select the free path or the paid path based on the accounting data stored in the memory area.

9. A method comprising:
 accessing, by a cloud service from a mobile computing device, context describing the mobile computing device, the context identifying one or more network access points;
 obtaining accounting data associated with the mobile computing device based on the accessed context, the accounting data comprising credentials for a user to access one or more network access points;
 selecting, by the cloud service, one of the network access points based at least on the obtained accounting data, the cloud service storing at least one set of sequenced instructions for connecting to a network through the selected network access point, upon execution of the at least one set of sequenced instruction, the at least one set of sequenced instructions identifying a sequence of web pages to navigate through for establishing connection to the one of the network access points based on data describing how other users connected respective mobile devices to the selected network access point;
 identifying, to the mobile computing device, the selected network access point and providing a set of instructions for replay by the mobile computing device to connect to the network; and
 replacing at least one expression in the at least one set of sequenced instructions received by the mobile computing device with the credentials for the user and a user identifier associated with the user of the mobile computing device to create a personalized set of sequenced instructions for the mobile computing device to submit to at least one web page from the sequence of web pages for establishing connection to the selected network access point for a first time for the user.

10. The method of claim 9 further comprising personalizing the set of sequenced instructions by modifying the sequence based on the obtained accounting data.

11. The method of claim 10, wherein modifying the sequence comprises at least one of adding or removing at least one of the sequenced instructions.

12. The method of claim 10, wherein modifying the sequence comprises at least one of adding or removing at least one web page from the sequence of web pages before execution.

13. The method of claim 9, wherein accessing the context comprises accessing at least one of a user context, a device context, or a network context.

14. The method of claim 9, wherein said selecting the one of the network access points occurs based on a social graph of a user of the mobile computing device, the social graph reflecting a relationship of the user to other users.

15. The method of claim 9, further comprising personalizing the set of sequenced instructions by:
 selecting one or more advertisements for a user of the mobile computing device based on at least one of the context data and the accounting data, and
 inserting additional instructions into the set to display the selected one or more advertisements to the user.

16. The method of claim 9, further comprising personalizing the set of sequenced instructions by at least one of adjusting a quality of service, selecting a network protocol, or securing a connection between the mobile computing device and the network.

17. One or more computer storage media embodying computer-executable components, said components comprising:
 a communications interface component that when executed causes at least one processor to receive, by a cloud service from a mobile computing device, context describing the mobile computing device, the context identifying for a user to access one or more network access points;
 an account manager component that when executed causes at least one processor to access accounting data associated with the mobile computing device based on the context received by the communications interface component and to select, by the cloud service a network access point based at least on the accessed accounting data, the cloud service storing at least one set of instructions for connecting to a network through the selected network access point, the set of instructions including an ordered sequence of commands for navigating web pages to establish an online connection to the selected network access point; and a customization component that when executed causes at least one processor to personalize the set of instructions by modifying the ordered sequence based on data of other users accessing the selected network and the credentials of the user, the communications interface component further identifying, to the mobile computing device, the selected network access point and providing the set of instructions personalized by the customization component for replay by the mobile computing device to enable the mobile computing device to navigate through the web pages in sequential order to connect to the network for a first time for the user.

18. The computer storage media of claim 17, wherein the communications interface component further embeds an identifier of the selected network access point and the set of instructions in a geospatial tile data structure for distribution to the mobile computing device.

19. The computer storage media of claim 18, wherein the communications interface component further de-duplicates the set of instructions to reduce a size of the geospatial tile data structure.

20. The computer storage media of claim 19, further comprising a report component for generating a report for the mobile computing device based on the personalizing performed by the customization component.

* * * * *